United States Patent
Denton et al.

(10) Patent No.: US 7,292,904 B2
(45) Date of Patent: Nov. 6, 2007

(54) METHOD FOR SIZING PRODUCTION LOT STARTS WITHIN A LINEAR SYSTEM PROGRAMMING ENVIRONMENT

(75) Inventors: Brian T. Denton, Essex Junction, VT (US); John J. Forrest, Peekskill, NY (US); Robert John Milne, Jericho, VT (US)

(73) Assignee: International Business Machines Corporation, Armonk, NY (US)

(*) Notice: Subject to any disclaimer, the term of this patent is extended or adjusted under 35 U.S.C. 154(b) by 585 days.

(21) Appl. No.: 10/605,854

(22) Filed: Oct. 31, 2003

(65) Prior Publication Data

US 2005/0096771 A1   May 5, 2005

(51) Int. Cl.
*G06F 19/00* (2006.01)
*G06F 9/46* (2006.01)
(52) U.S. Cl. .................. 700/100; 718/104; 705/28
(58) Field of Classification Search ............. 700/101, 700/102, 103; 718/104; 705/28
See application file for complete search history.

(56) References Cited

U.S. PATENT DOCUMENTS

| | | | |
|---|---|---|---|
| 5,216,593 A | 6/1993 | Dietrich et al. | 345/467 |
| 5,408,663 A * | 4/1995 | Miller | 718/104 |
| 5,548,518 A | 8/1996 | Dietrich et al. | 700/100 |
| 5,715,165 A | 2/1998 | Luh et al. | 700/173 |
| 5,943,484 A | 8/1999 | Milne et al. | 700/100 |
| 5,971,585 A * | 10/1999 | Dangat et al. | 700/102 |
| 2002/0156669 A1* | 10/2002 | Verhaegh et al. | 705/8 |
| 2003/0033180 A1* | 2/2003 | Shekar et al. | 705/7 |
| 2003/0208392 A1* | 11/2003 | Shekar et al. | 705/8 |
| 2003/0216952 A1* | 11/2003 | Klett et al. | 705/8 |
| 2003/0229550 A1* | 12/2003 | DiPrima et al. | 705/28 |
| 2004/0030428 A1* | 2/2004 | Crampton et al. | 700/101 |

OTHER PUBLICATIONS

Nemhauser, G.L. and Wolsey, L.A., 1999, Integer and Combinatorial Optimization, A Wiley-Interscience Publication, John Wiley & Sons, Inc., NY.

Sullivan, G. and Fordyce, K., 1990, IBM Burlington's Logistics Management System, INTERFACES 20: Jan.-Feb. 1, 1990 (pp. 43-64).

(Continued)

*Primary Examiner*—Leo Picard
*Assistant Examiner*—Sheela Rao
(74) *Attorney, Agent, or Firm*—Ryan K. Simmons (57) ABSTRACT

Allocating limited manufacturing resources to achieve a feasible production plan that is consistent with customer demand is a difficult and common problem faced in many manufacturing industries. For large-scale multi-stage manufacturing systems, existing methods are typically based either on allocating limited resources sequentially, according to a priority ranked list of production starts, or linear programming based models. The output of such planning models is a production plan which specifies the quantity of each part to produce at each plant, using resources available to the enterprise. Typically there are lot-sizing rule defining the permissible production start quantities. The invention disclosed herein is a method for applying these rules to the lot-sizing of production starts within a linear program. It employs advanced heuristics that consider both established operational objectives (e.g. customer service, short lead times, low inventory, and prioritized allocation of supply and capacity) and lot-size rules to efficiently compute a feasible production plan for the division.

22 Claims, 8 Drawing Sheets

OTHER PUBLICATIONS

"Passing Your Model Using Mathematical Programming System (MPS) Format", http: www6.software.ibm.com/sos/features/featur11.htm.

Lyon, P, Milne, R. John, Orzell R., and Rice, R., 2001, "Matching Assets with Demand in Supply-Chain Management at IBM Microelectronics", INTERFACES 31: Jan.-Feb. 1, 2001 (pp. 108-124).

* cited by examiner

PRIOR ART

METHOD FOR SIZING PRODUCTION LOT STARTS WITHIN A LINEAR SYSTEM PROGRAMMING ENVIRONMENT

BACKGROUND OF INVENTION

1. Field of the Invention

The present invention relates to computer implementable decision support systems for determining a production plan of feasible production starts such that the plan is consistent with discrete lot-sizing rules, production constraints, and operational objectives. General methodologies within this field of study include optimization and heuristic based algorithms, constraint based programming, and simulation.

2. Background Description

Semiconductor manufacturing involves a range of activities including everything from growing silicon crystals, the source of silicon wafers upon which integrated circuits are grown, to the actual placement and soldering of finished modules to a printed circuit board. Initially raw wafers, cut from a silicon ingot, are processed through a specific sequence of work centers. The end goal of this process is to build a set of devices (integrated circuits) on the surface of the silicon wafer according to a specified circuit design. At a high level, this process includes repeatedly applying four basic steps: deposition, photolithography, etching, and ion implantation. These steps are the means by which materials with specific dielectric properties (e.g. conductors, insulators) are patterned on the surface of the wafer according to precise design specifications. These steps are repeated many times to build up a sequence of layers, where initial layers correspond to the building of circuit components (e.g. transistors) and subsequent layers correspond to metal interconnections between components. Once devices have been built on a wafer they are tested and their properties are recorded for later reference. Wafers are then diced and sorted into individual devices, and subsequently bonded to a substrate and packaged to assemble a module. These modules, which are further tested to determine electromagnetic and thermal characteristics, are eventually assembled onto printed circuit boards to make cards. Finally, cards are tested and those that pass inspection are eventually used in the assembly of a wide range of finished electronic products (e.g. PCs, Printers, CD Players). From the point of view of semiconductor manufacturing, the modules and cards are, by and large, the finished products taken to market.

Figure 1:
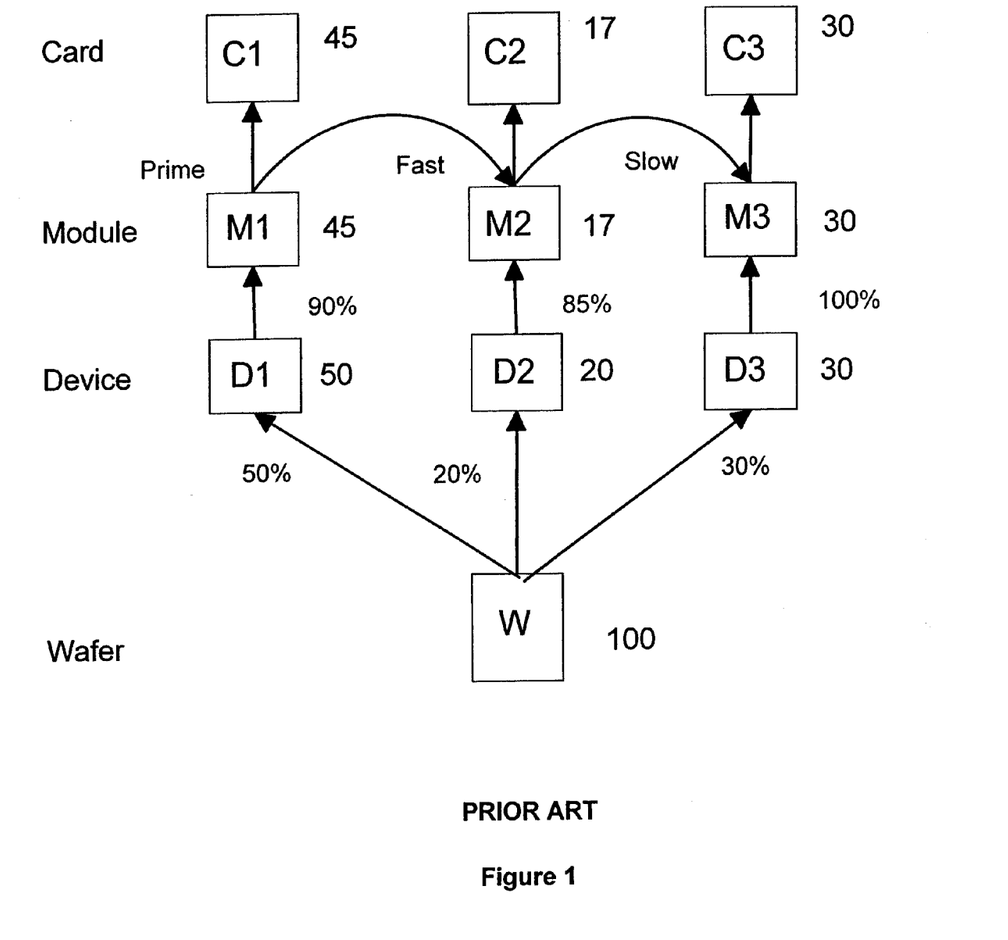
FIG. 1: Example of yield, binning, and substitution processes with respect to the BOM in semiconductor manufacturing. PRIOR ART

A Bill-of-material (BOM) is the source of data that specifies components used in the assembly of each particular part number (PN) produced within the manufacturing system. The BOM gives a graphical representation of the dependencies between assemblies and their components. A simple BOM for the wafer, device, and module stages is illustrated in FIG. 1. Once the circuit design is complete the finished wafer, W, is tested. Devices may have a range of quality attributes, denoted by different PNs, D1, D2 and D3 in FIG. 1. For example, testing may reveal some devices operate at a prime frequency, some at a fast frequency, and some at a low frequency (e.g. 50%, 20%, 30% respectively). This aspect of semiconductor manufacturing is referred to as binning. In FIG. 1 further processing is carried out to build module PNs M1, M2 and M3 which are eventually assembled into cards C1, C2 and C3. The material flows in FIG. 1 are based on starting with 100 units of finished wafer. For example, assembly M1 is produced from component D1 with a yield of 90%. Thus, the 50 devices can be used to build 45 modules. Another attribute of the semiconductor manufacturing problems is material substitution. For example, in FIG. 1 the arcs from M1 to M2 and M2 to M3 denote potential substitutions, such as prime modules for fast modules.

A fundamental problem faced in all manufacturing industries is the matching of demand and assets over time. Production lead times necessitate the advance planning of production so that production throughout the production system are coordinated with the end customers demand for any of a wide range of finished products (typically on the order of thousands in semiconductor manufacturing). Such advance planning depends on the availability of finite resources which include: finished goods inventory, work in process (WIP) at various stages of the manufacturing system, and work-center capacity. Furthermore, for a particular job there may be multiple locations, processes, and work centers that could be utilized. Planning and scheduling functions within the semiconductor manufacturing industry can be categorized in various ways. Sullivan and Fordyce (1990) describe a tier system in which each tier is defined by the time frame to which the decisions pertain. Their taxonomy of planning and scheduling decisions is a hierarchical one in which decisions in higher tiers (longer range decisions) affect lower tiers (shorter range decisions).

Short range scheduling involves disaggregating daily targets for production starts into a detailed work-center level schedule that considers lot-sizing constraints. These constraints specify allowable quantities of a production start. For instance, a diffusion furnace may take a batch of at most 100 wafers at a time. Thus an example of a lot-sizing rule would be to always fully load the diffusion furnace each time it is utilized to build a particular PN. This translates to a lot-sizing constraint that daily production starts must be in integer multiples of 100 wafers. In general there may be many such constraints at various points within a multi-stage manufacturing system due to work-center design, container sizes, or yield considerations.

Decisions in higher tiers compute aggregate production plans (e.g. at a daily or weekly granularity) which are subsequently disaggregated in lower tiers to compute detailed short term schedules. Traditionally, higher tier planning systems do not consider lot-sizing rules and therefore result in inefficiency when lower tiers execute these production plans. For example, consider the simplified case in which only two PNs are produced, and each has a lot-sizing rule requiring that they are produced in batches of 100. Further, assume that the firm only has available work-center capacity to build 100 parts per day, however, the higher tier planning system does not consider this constraint when computing a production plan. Therefore, if demand for the two PNs, PN1 and PN2, was 20 and 80 respectively on a particular day, and assuming cycle time is zero, then the higher tier planning system would specify production starts of 20 units for PN1 and 80 units for PN2. Upon receipt of this plan the lower tier scheduling system would be forced to start 100 units of one of the PNs and zero of the other on the specified date, resulting in unanticipated late production of one of the required PNs. However, if the higher tier planning system considered the lot-sizing constraints, it could have anticipated this situation and planned to start a second lot of 100 in advance of the date it is required, and thus utilize work-center capacity (if available) at an earlier time. This simple example illustrates one of the underlying problems with production planning systems that do not consider lot-sizing constraints.

SUMMARY OF INVENTION

The present invention is directed to a production planning system for simultaneously considering production constraints such as finite supply and work-center capacity, as well as discrete lot-sizing constraints, to compute a near optimal production plan that is consistent with operational objectives. The implementation of this invention is presented in the context of semiconductor manufacturing, however, the invention has applicability to production planning in other discrete parts manufacturing industries as well.

Many production planning software applications have utilized linear programming (LP) models and solution methodology to create optimal production plans. This has been successful because this modeling approach simultaneously considers production constraints throughout the supply chain to determine a globally optimal production plan for the enterprise. However, one limitation of linear programming is that it does not provide the ability to explicitly consider discrete constraints such as lot-sizing. Consequently, as an example, the LP may output a production start for 39.5 wafers although the manufacturing line may require each production start quantity to be a multiple of 24 wafers (e.g. wafer carrier may hold at most 24 wafers). In semiconductor manufacturing, common production rules for are based on the specification of a minimum, maximum, and multiple lot-size. The minimum lot-size is the smallest permitted production start, the maximum lot-size is the largest, and the production start must be evenly divisible by the multiple value. Thus, the permitted lot-sizes are restricted to the set (minimum, minimum+multiple, minimum+2multiple, . . . , maximum). The invention disclosed herein also handles the more general case in which the permitted lot-sizes are defined by an arbitrary set of discrete values.

Prior to the present invention, there have been other general approaches for addressing lot-sizing in a production planning context. The most commonly referenced approach in the academic literature has been to formulate the problem as a mathematical program referred to as a mixed integer program (MIP). This type of model is an extension of linear programming. It is referred to as "mixed integer" because the production starts are restricted to a set of discrete values while other variables (e.g. interplant shipments) may remain continuous. The restriction of production start variables to an arbitrary discrete set of values can be achieved by adding additional variables and constraints to the formulation. The MIP approach lies within a class of problems referred to by those practiced in the art as NP-hard (see Nemhauser and Wolsey 1999). Generally MIP problems cannot be solved exactly in a reasonable period of time when there is a large amount of data. Consequently, heuristics based on integrating linear programming and lot-sizing are required for large-scale production planning problems encountered in practice. Another prior art practical approach has been to first run the LP to completion (without considering lot-size constraints) and secondly run a lot-sizing heuristic to post-process the results of the LP. A deficiency of this approach is that the impact of lot-sizing at one level of the BOM is not proliferated to PNs at other levels of the supply chain. Another method involves using a combination of LP and lot-sizing heuristic at each level of the BOM (U.S. Pat. No. 5,943,484). This works well in a Material Requirements Planning (MRP) context where supply and work-center capacity constraints are not considered. However, in semiconductor manufacturing work-centers (e.g. photolithography cluster tools) are very expensive and capacity is limited. Consequently, the MRP approach is not appropriate when the goal is to compute a feasible production plan where prioritized demands are satisfied as well as possible but may not be completely satisfied on time if work-center capacity and supply constraints prevent it. The present invention is directed toward overcoming this limitation of conventional MRP methods.

Our invention is a fast Linear Programming (LP) based method for computing near optimal lot-sized production starts. The method begins by creating an initial solution to the relaxed (without lot-sizing) LP solution in memory. Next, many iterations are done to improve the solution. At each iteration a heuristic is used to modify a set of production starts (e.g. 39.5 in the example above may be adjusted to 24 or 48) to satisfy the lot-sizing constraints and sub-steps of the LP are re-executed to ensure feasibility and near optimality. Because the tentative solution remains memory-resident and the heuristics and LP sub-steps are integrated, thousands of iterations may be accomplished in a reasonable period of time to determine a near optimal production plan. These iterations are carried out through carefully defined steps to efficiently navigate the large search space of potential solutions. As a result, high quality lot-sized solutions are obtained for large-scale problems in a reasonable period of time, something the prior art could not achieve. This enables the creation of feasible production plans which are consistent with how production starts are lot-sized on the manufacturing line. The ability to capture this additional level of detail in an advanced planning and scheduling system can improve planning metrics such as on-time delivery, inventory control and production and shipping costs.

DETAILED DESCRIPTION

Figure 2:
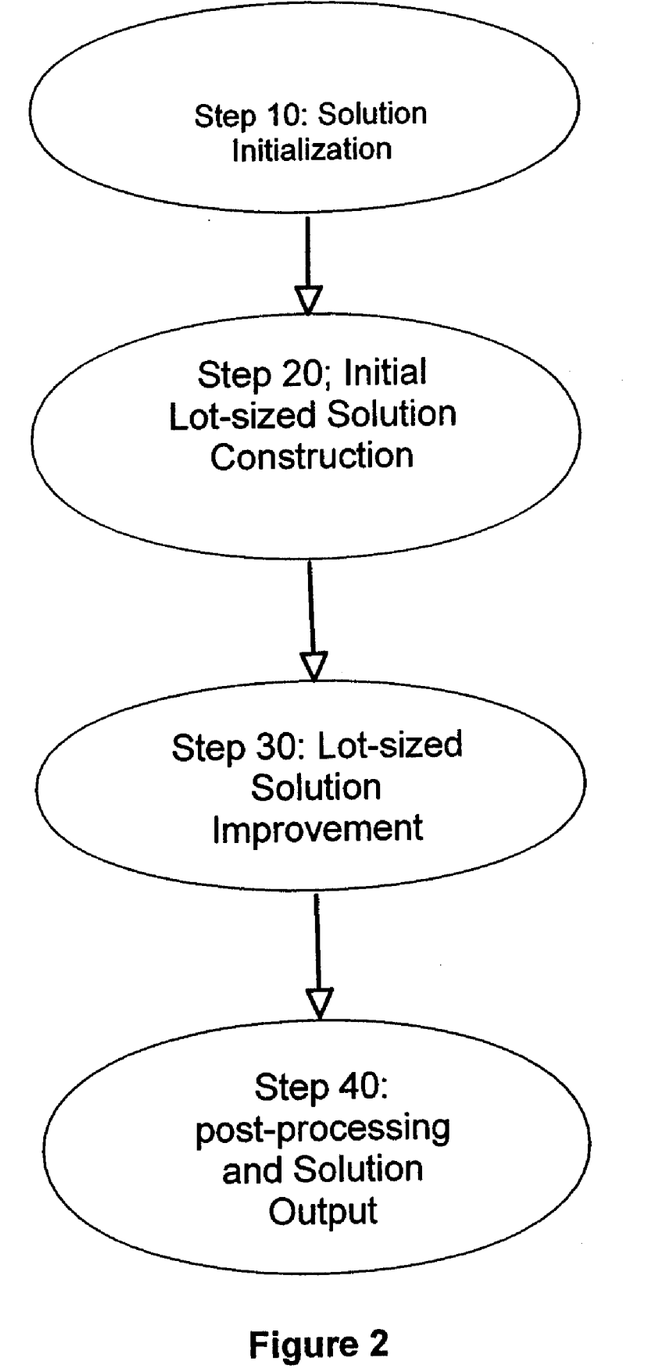
FIG. 2: Flow chart showing the major steps of the lot-sizing search algorithm.

The invention starts with a production plan obtained by solving a Linear Program (LP) with continuous production start variables, referred to as the relaxed LP since it ignores lot-sizing constraints. Further steps seek to find a near optimal solution which also satisfies lot-sizing constraints. This involves sequentially modifying production start variables in the LP. Each production start considered in the LP has an associated production start variable, referred to simply as a variable from this point forward. These variables are indexed by the PN associated with the production starts, the date on which the production start occurs, the plant in the division at which the production start occurs, and the process by which the PN is manufactured at the plant. The flowchart in FIG. 2 illustrates the flow of the major steps in the algorithm that we describe below:

Step 10 (Solution Initialization): Formulate, preprocess and solve the relaxed LP using a prior art method.

Step 20 (Initial Lot-sized Solution Construction): Iteratively adjust variable values so that they satisfy discrete lot-size constraints, including the following sub-steps:

i) Branch variables with associated lot-size constraints that have values that are within a predetermined tolerance of feasible lot-sized values.

ii) Compute next lower and higher feasible lot-sizes for variables not satisfying lot-sizing constraints and sort the variables in a list by date of the production start, BOM position of the PN, and difference between the current value and the nearest higher feasible lot-sized value. If all variables are lot-sized then proceed to Step 30.

iii) Choose the first n variables in the sorted list.

iv) Branch up the chosen n variables and re-solve the resulting LP. If the LP has a feasible solution, and the change in the objective function does not exceed a user defined tolerance, then return to sub-step (ii).

v) If n>1, then relax branching decision in step (iv), set n=1 and return to step (ii); otherwise branch down on the variable and resolve the resulting LP.

vi) Select the best solution from the up and down branches and return to sub-step (ii).

Step 30 (Lot-sized Solution Improvement): Iteratively compute solutions to separable sub-problems, including the following sub-steps:

i) Separate variables into subsets based on the BOM structure and store the subsets in a list ii) Choose the first unprocessed subset in the list and mark it as processed iii) Relax branching decisions made in Step 20 for variables in the subset iv) Solve the resulting mixed-integer program using method of step 20 v) If an improved solution results from solving the mixed-integer programs then update the global solution with the local improvement.

vi) If the user specified maximum runtime has been exceeded then proceed to step 40. If all subsets in the list have been marked as processed, then mark them all as unprocessed and return to substep (ii).

Step 40 (Post-processing and Solution Output): Modify the final solution to conform to discrete lot-size constraints and output final solution.

In our specific implementation of the invention, the lot-size constraints are stored in a file in which records specify minimum, maximum, and multiple lot-size values which are indexed by PN, date, plant, and production process. The LP is stored in a standard MPS file format (see, for example, IBM Optimization Library Guide and Reference). In Step 10 the initially relaxed (without lot-sizing) LP is solved using a known LP solution methodology such as the simplex method (Nemhauser and Wolsey, 1999, chapter II.2).

Figure 3:
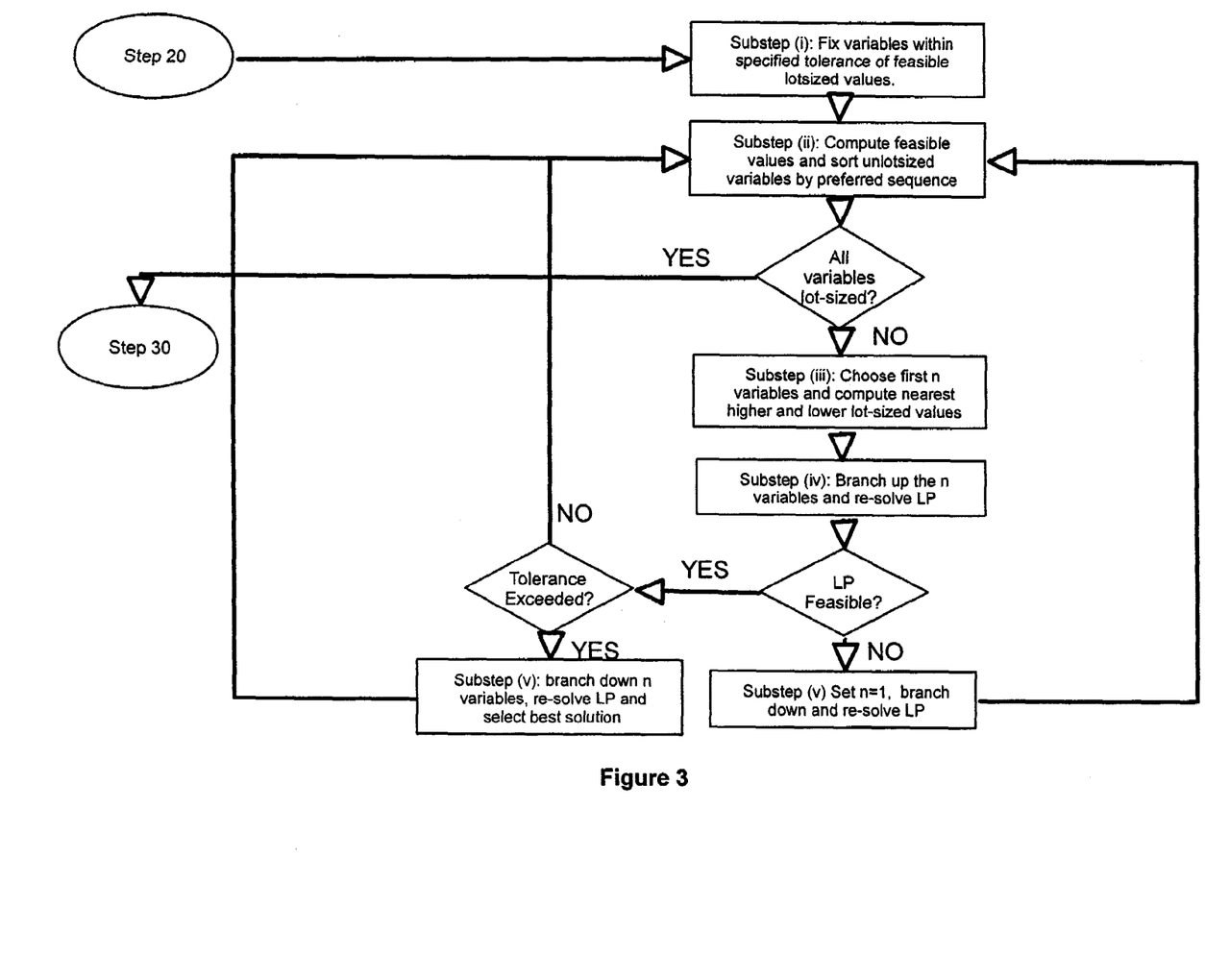
FIG. 3: Flow chart for sub-steps of Step 20.

FIG. 3 illustrates the detailed logical flow among the sub-steps of Step 20. This Step computes an initial solution which satisfies the lot-size constraints specified by minimum and multiple lot-size parameters (the maximum lot-size constraint is handled in Step 40 as a post-processing step). Step 20 begins with the solution of the relaxed LP, created in Step 10, and maintained in memory. First, variables which are very close (within a defined tolerance) to feasible lot-sized values are fixed to these values by adding variable bounds, and then remaining variables are considered iteratively. The initial sequence of variables is determined by sorting first based on production start date, next by BOM position, and finally by difference between the initial LP solution and the next higher feasible lot-sized value. The variables are ordered first by date from earliest to latest. Then variables with a given date are ordered based on a sequence specified in a user defined file. The sequence is from bottom to top of the BOM (raw-materials such as raw wafers to end-items such as cards). Finally, the sequence of variables for a given PN number, within a given period, is increasing in the discrepancy between the variable's value as computed from the relaxed LP and the next higher feasible lot-sized value.

For each set of n variables (in sequence) in Step 20 a decision is made to either increase the production start (referred to as branching up) or decrease (branching down) to the next higher or lower feasible lot-sized value, respectively. Either of these options is permissible, though may not be feasible from the point of view of solving the LP resulting from adding upper or lower bounds on the variable. The ordering of the variables and the different combinations of up and down values can be expressed as options in a binary tree, such as that in FIG. 5. A binary tree consists of nodes (circles in FIG. 5) and branches between the nodes. In a binary tree each node represents a LP to be solved and each node branches to two other nodes denoting branching up or down for a given variable to the next higher or lower feasible lot-sized values respectively. In reality the use of a binary tree is an approximation since a given variable may take on a range of possible values (e.g. min, min+mult, min+2mult, . . . ). However, in practice the values closest to the value of the variables in the relaxed LP are likely to contain the optimal solution. Each complete path through the binary tree represents one of the potentially feasible solutions. In general, the number of potential solutions is 2n, where n is the number of variables, and the problem size grows geometrically with respect to the variables indices (PN, date, plant, process). In practical production planning problems encountered in semiconductor manufacturing there may be tens of thousands of variables.

The branching strategy in sub-step 20 (ii) is to preferentially branch variables up (provided the resulting LP has a feasible solution), which is consistent with the fact that the cost of carrying additional inventory is lower than the cost of satisfying demand late in the semiconductor industry. An exception to the decision to branch up would be applied if the change in the objective function between the original LP (prior to branching) and the new LP (after branching) exceeds a user defined tolerance. (This tolerance may be different than that used in sub-step (i).) In this case the decision would be reversed and the variable would be branched down. Further, since the LP is resolved at each iteration the supply is rebalanced to utilize any additional inventory that is generated.

Figure 4:
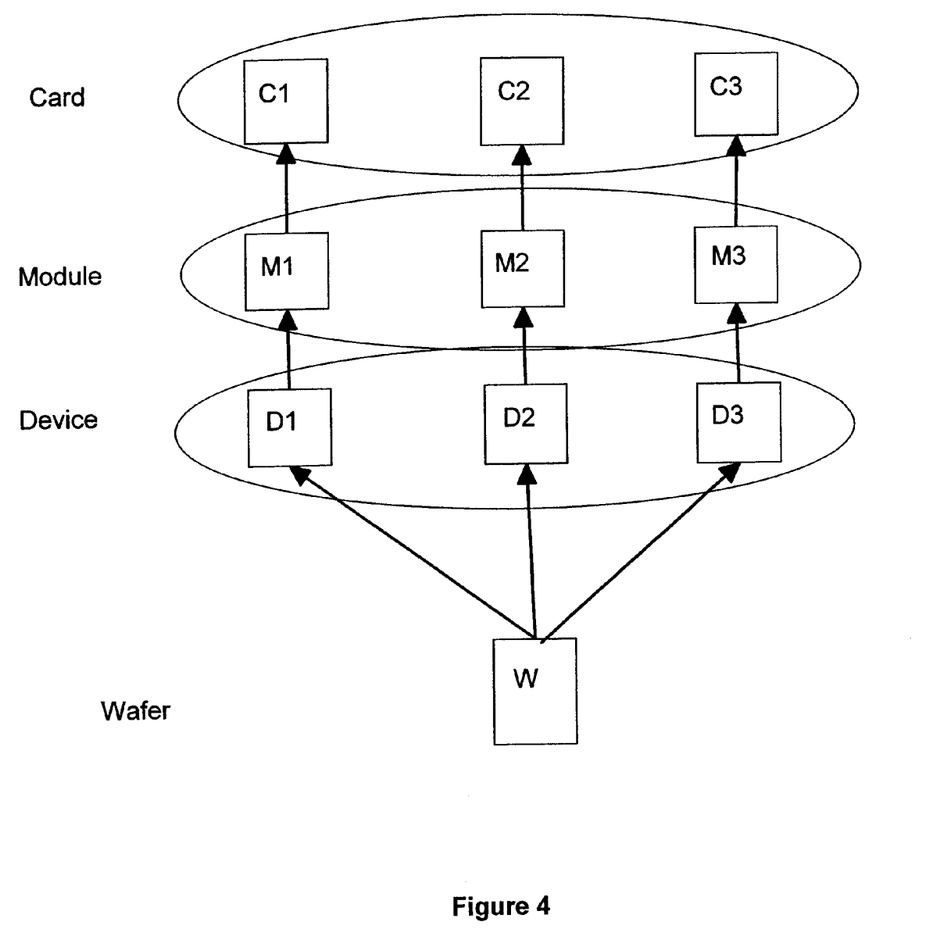
FIG. 4: Flow chart of variable sequencing with respect to the BOM in Step 20.

While moving through the binary tree, it is possible that it will be infeasible to branch up since doing so may, for example, violate a production constraint (e.g. insufficient work-center capacity to increase the production start). In such cases it is necessary to backtrack, i.e. to reverse the lot-size decision and branch down. Further, the potential for backtracking is not limited to a single iteration. For example, it is possible that backtracking one iteration would not be sufficient because rounding down could also be infeasible. This multiple iteration backtracking can occur when a previously lot-sized variable for an assembly (e.g. a card) has been fixed and thus it is infeasible to branch down a variable representing a component to the assembly (e.g. a module). Thus there is the potential for backtracking multiple iterations, which can be very costly in terms of runtime. However, sorting the variables from lowest to highest level (e.g. raw materials to finished products) according to their position in the BOM limits this backtracking to a single iteration at most. FIG. 4 illustrates the search strategy in Step 20 with respect to the BOM in which variables are considered one level at a time. In FIG. 4, variables for parts D1, D2, D3 are lot-sized, followed by variables for parts M1, M2, M3, and finally variables for parts C1, C2, C3.

Figure 5:
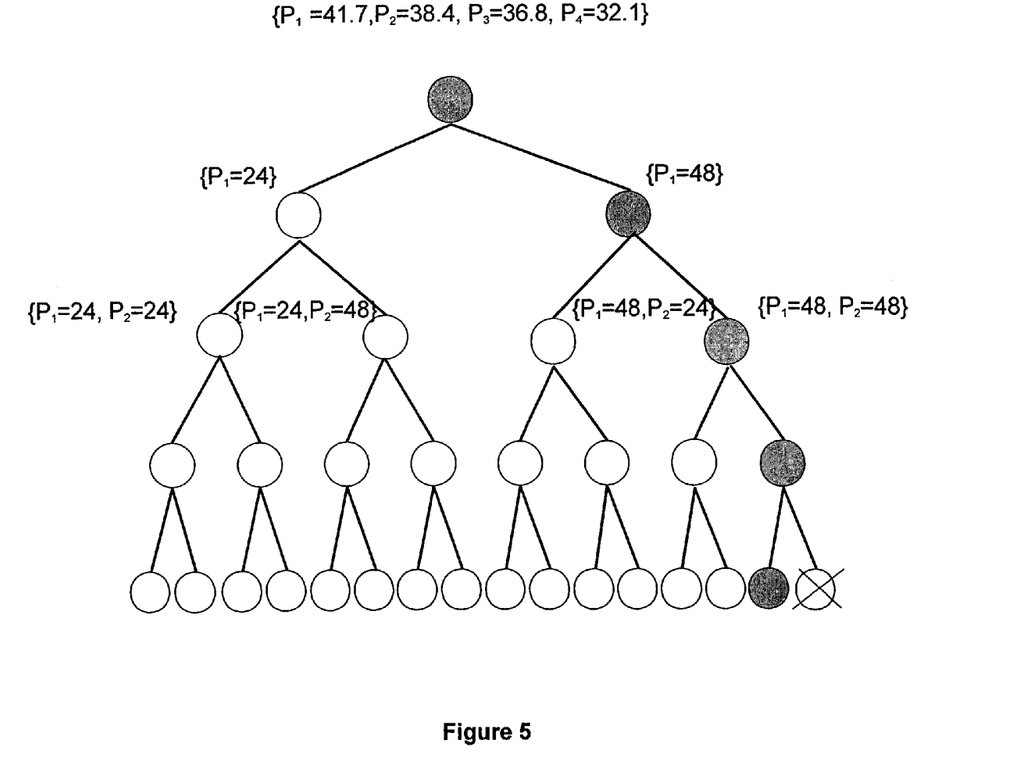
FIG. 5: Flow chart of depth-first search through binary tree in Step 20.

FIG. 5 illustrates a simple example in which n=1 and there are 4 variables sequenced in order (P1, P2, P3, P4) and lot-size constraints specify that each variable must be an integer multiple of 24. Each variable may take either of 2 values, and therefore there are 16 potential solutions. As each variable is branched up or down the LP is resolved to determine the impact on the rest of the supplychain. The top node in the tree represents the relaxed LP and the first variable, P1=41.7, can branch down to 24 or up to 48. The up branch is taken and the LP is resolved with the P1 variable fixed at 48. If the solution to the LP is feasible, and within tolerance, then the algorithm proceeds to the next variable (P2 in the example in FIG. 5). However, if the LP variable had been found to be infeasible then the algorithm would have backtracked, i.e., reversed the branching decision and instead branched down to P1=24. Next, P2 is chosen, its up branch is taken and the LP is re-solved. The remaining variables P3 and P4 are similarly explored in this iterative manner until a feasible lot-sized solution is computed. In FIG. 2 shaded nodes indicate LPs with feasible solutions. The cross through the last node, i.e. the node in the lower right hand corner of FIG. 5, indicates the LP had no feasible solution, thus it was necessary to backtrack one iteration and branch down.

Figure 6:
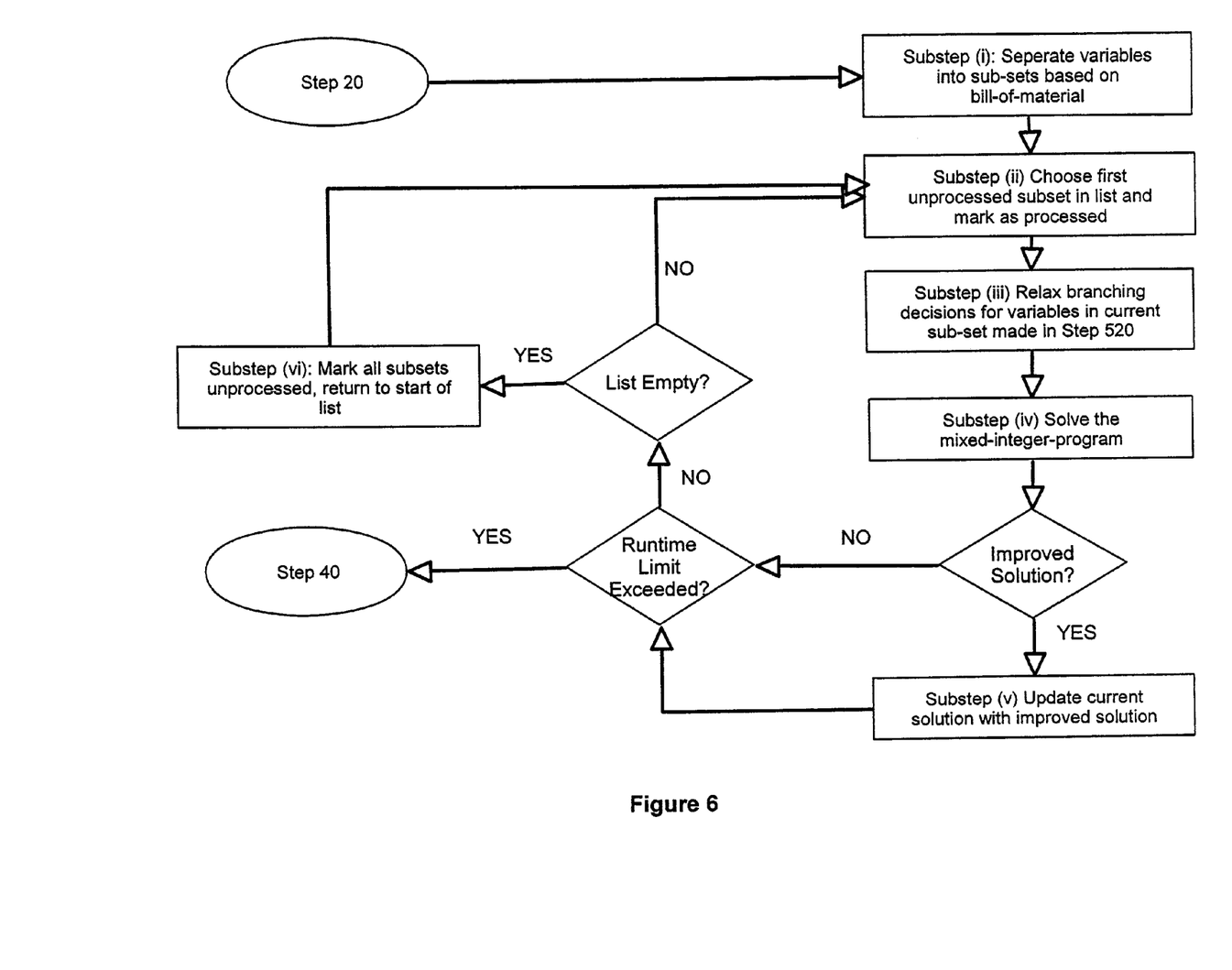
FIG. 6: Flow chart for sub-steps of Step 30.
Figure 7:
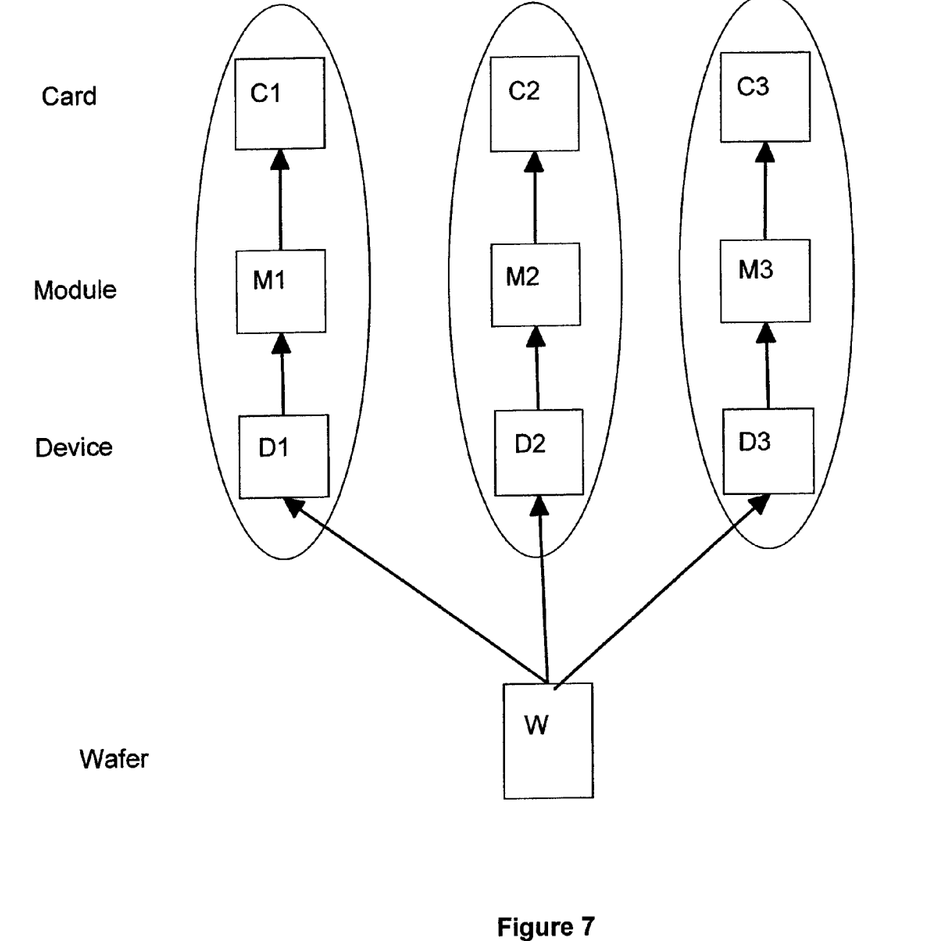
FIG. 7: Flow chart of variable sequencing with respect to the BOM in Step 30.

FIG. 6 illustrates the detailed logical flow among the sub-steps of Step 30. In Step 30 a series of iterations are conducted to improve the quality of the solution obtained in Step 20. The solution is successively improved by partitioning the problem into sub-problems and computing improved local solutions for each sub-problem. The goal is to make local improvements to the global solution one subset at a time. The search iterates through sub-problems until either the solution improvement for a pass through the subsets is below some user defined tolerance, or else the total run time exceeds the allotted time specified by the user (e.g. one hour). In this step, subsets of variables are defined in a user specified file. Each subset of variables has its branching decisions (made in Step 20) relaxed and a heuristic search is carried out to determine if a different lot-sizing of the variables in the subset would improve the solution. Each subset of variables is linked across the supply chain as illustrated in FIG. 7. In this example there are 3 subsets of variables (C1, M1, D1), (C2, M2, D2) and (C3, M3, D3). Each of these subsets would be considered separately. Using the method of Step 20 new potential combinations of lot-sized values for variables in the set can be considered. Since the choice of variables is orthogonal to the sequencing of variables in Step 20 this step will explore solution improvement opportunities not considered by the Step 20 search strategy.

The method for separating variables into sub-sets in Step 30 is an iterative process involving scanning the BOM. Each iteration begins with a finished good part at the top of the BOM, i.e., parts with external demand that are not components to any other parts. A breadth first search is carried out, and all parts connected through the BOM to the finished good part are grouped into the same set. Once all parts collected the iteration is complete and a new iteration begins with the next unprocessed finished good part. The process continues until all parts have been allocated to a unique sub-set. For example, in FIG. 7, the first iteration would begin with part C1 being added to a new sub-set, next part M1 would be added to the same sub-set, and finally part D1 would be added to the subset. The next iteration would begin with part C2, and would define a new sub-set of parts (i.e. (C2, M2, D2)). (Note that the method of separating variables into mutually exclusive sub-sets described above is not the only possible method. Alternative embodiments of the invention could include, for instance, overlapping sub-sets of variables.) Step 40 involves post-processing the solution generated from steps 20 and 30. In the preferred embodiment of the invention, steps 20 and 30 ignore the maximum lot-size constraint because it can be handled more efficiently via post processing. Post-processing in Step 40 involves splitting a production start into smaller discrete lots that satisfy the maximum lot-size constraint. To achieve a feasible solution, it is assumed that the maximum lot-size value is an integer multiple of the multiple lot-size value. This involves separating the production start variable into multiple lots, each of which is less than the maximum allowable lot-size. In one embodiment of the invention, the lots may be split as equally as possible into n lots, where n equals ceil(P/(MAX)), and ceil() is a function that rounds the argument up to the next integer, P is the production start variable, and MAX is the maximum allowable lot-size. In another embodiment of the invention the lots may be split into n−1 lots which equal the maximum lot-size, and a single lot with the remainder of the production start in it.

For example, if Min=mult=10, max=50, and P=170, then one embodiment would result in nearly equal sized lots of 40, 40, 40, and 50 while another embodiment would result in lots of 50, 50, 50, and 20.

Figure 8:
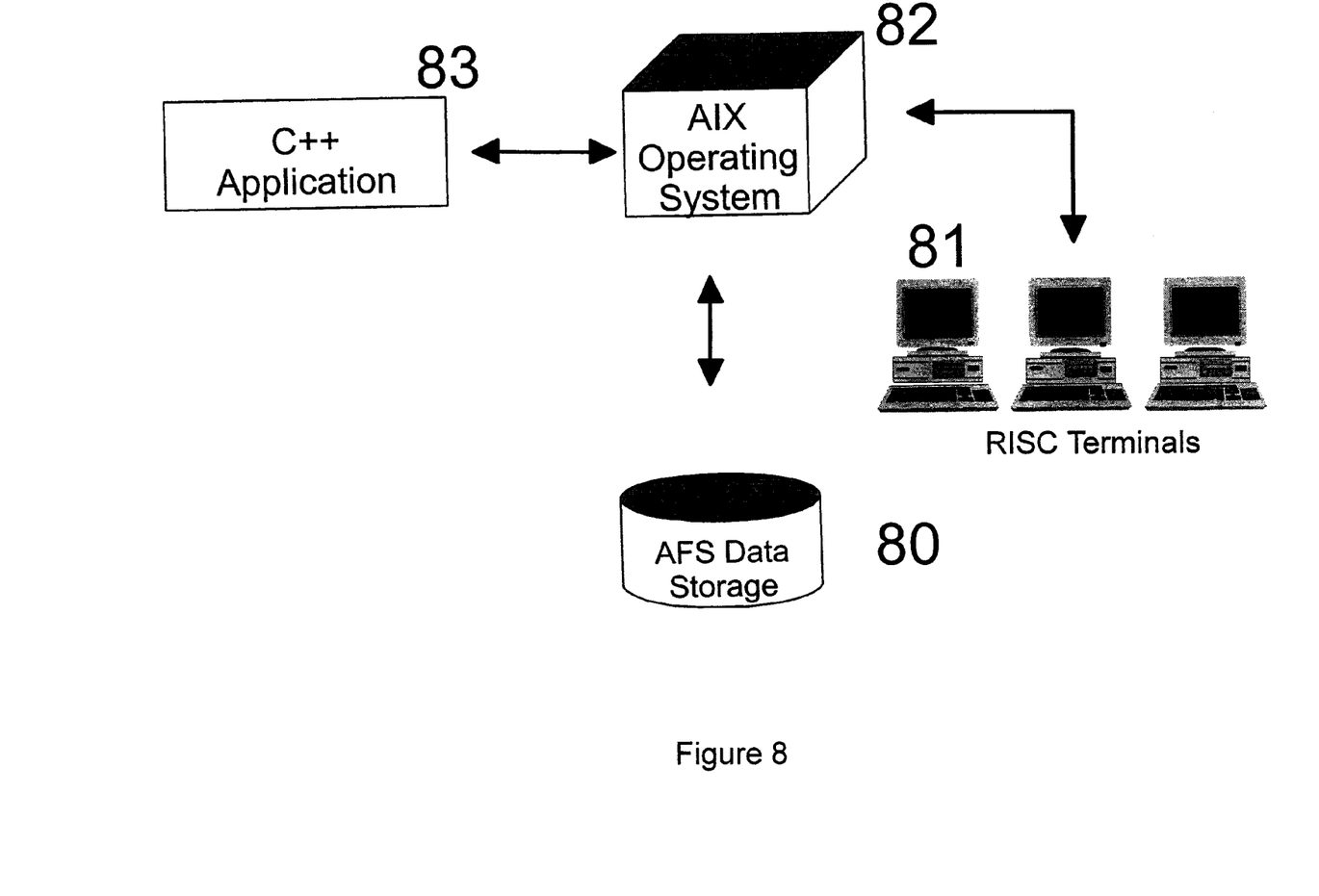
FIG. 8: Block diagram showing system level source application, storage, operating system and user interface components.

Referring to FIG. 8, the present invention has been implemented on an IBM SP2 machine with AFS for data storage 80. The SP2 is a collection of IBM RISC 6000 systems 81 running under a common AIX operating system 82. The steps for implementing the present invention are preferably programmed in C/C++ application software 83. It should be understood by those of ordinary skill in the art, however, that the represent invention is not limited to the above implementation and is independent of the computer/system architecture. Accordingly, the present invention may equally be implemented on other computing platforms, programming languages and operating systems, and also may be hardwired into a circuit or other computational component.

While the invention has been described in terms of the preferred embodiments, those skilled in the art will recognize that the invention can be practiced with modification within the spirit and scope of the appended claims.

The invention claimed is:

1. A method for computing a production plan, comprising the steps of:
  a). solving a linear program to determine a production plan that is consistent with operational objectives and production constraints;
  b). sequencing production start variables based on start date, position in a bill-of-material, and degree of infeasibility; and
  c). modifying production starts in this sequence and according to a branching strategy, such that lot-size constraints and production constraints are satisfied.

2. The method of claim 1, wherein the branching strategy involves branching multiple variables in each iteration, until an infeasible linear program is encountered, after which branching is reset to one variable at a time.

3. The method of claim 1, wherein the step of sequencing production start variables with respect to the position of a part number in the bill-of-material is obtained from raw materials to end products.

4. The method of claim 1, wherein the step of sequencing production start variables uses a branching strategy based on branching up and subsequently branching down if either (a) a linear program resulting from branching up is infeasible or (b) a change in the objective function due to branching up exceeds a predefined tolerance.

5. The method of claim 1, wherein the lot-size constraints may be defined by a set of possible values.

6. The method of claim 1, wherein the lot-size constraints may be defined by an arbitrary or discrete set of possible values.

7. A method for improving a production plan comprising;
   a). separating production start variables into a plurality of sub-problems;
   b). relaxing imposed lot-sizing constraints using linear programming methods;
   c). determining if an improved solution to the sub-problem is feasible; and
   d). updating a global solution to reflect local improvements determined from solving the sub-problems.

8. The method of claim 7, wherein the step of separating production start variables into sub-problems is based on assembly and component relationships in a bill-of-material.

9. The method of claim 8, where the method further comprises iteratively solving sub-problems until no solution improvement is made in any of the sub-problems or as user defined run time limit is exceeded.

10. The method of claim 9, wherein a relaxed linear program contains production operation constraints.

11. The method of claim 10, wherein the relaxed linear program considers production operation constraints of capacity, inventory, supply, sourcing, and backordering.

12. A program storage device readable by machine, tangibly embodying a program of instructions executable by machine to perform method steps for determining a production plan, said method steps comprising:
   a). solving a linear program to determine a production plan that is consistent with operational objectives and production constraints;
   b). sequencing production start variables based on start date, position in a bill-of-material, and degree of infeasibility; and
   c). modifying production starts in this sequence and according to a branching strategy, such that lot-size constraints and production constraints are satisfied.

13. The program storage device of claim 12, wherein the branching strategy involves branching multiple variables in each iteration, until an infeasible linear program is encountered, after which branching is reset to one variable at a time.

14. The program storage device of claim 12, wherein the step of sequencing production start variables with respect to the position of a part number in the bill-of-material is obtained from raw materials to end products.

15. The program storage device of claim 12, wherein the step of sequencing production start variables uses a branching strategy based on branching up and subsequently branching down if either (a) a linear program resulting from branching up is infeasible or (b) a change in the objective function due to branching up exceeds a predefined tolerance.

16. The program storage device of claim 12, wherein the lot-size constraints may be by a set of possible values.

17. The program storage device of claim 12, wherein the lot-size constraints may be defined by an arbitrary or discrete set of possible values.

18. A program storage device readable by machine, tangibly embodying a program of instructions executable by machine to perform method steps for improving a production plan, said method steps comprising:
   a). separating production start variables into a plurality of sub-problems;
   b). relaxing imposed lot-sizing constraints using linear programming methods;
   c). determining if an improved solution to the sub-problem is feasible; and
   d). updating a global solution to reflect local improvements determined from solving the sub-problems.

19. The program storage device of claim 18, wherein the step of separating production start variables into sub-problems is based on assembly and component relationships in a bill-of-material.

20. The program storage device of claim 19, wherein the method further comprises iteratively solving sub-problems until no solution improvement is made in any of the sub-problems or as user defined run time limit is exceeded.

21. The program storage device of claim 20, wherein a relaxed linear program contains production operation constraints.

22. The program storage device of claim 20, wherein the relaxed linear program considers production operation constraints of capacity, inventory, supply, sourcing, and backordering.

* * * * *